United States Patent Office 3,155,692
Patented Nov. 3, 1964

3,155,692
3-ENOL ETHERS OF 2-HYDROXYMETHYL-3-OXO-5α-STEROIDS AND PROCESS FOR PREPARING SAME
Bernard Ellis, Derek Burn, and Vladimir Petrow, London, England, assignors to The British Drug Houses Limited
No Drawing. Filed Jan. 24, 1963, Ser. No. 253,751
Claims priority, application Great Britain, Jan. 26, 1962, 3,001/62
11 Claims. (Cl. 260—397.4)

This invention is for improvements in relating to organic compounds and has particular reference to steroidal materials containing an additional carbon substituent at $C_2$.

It is an object of the present invention to provide a new and general process for the preparation of the 3-enol ethers of 2-hydroxymethyl-3-oxo-5α-steroids, and additionally to provide such compounds for therapeutic, veterinary or investigational use or for employment as intermediates. The steroidal products of our co-pending application No. 253,750, filed January 24, 1963, which may be regarded structurally as the 3-enol ethers of 2-formyl-3-oxo-5α-steroids, may be converted by the process of this invention into the corresponding 2-hydroxymethyl derivatives. Many of the herein described derivatives possess valuable biological properties which render them of value in, for example, the veterinary field. Thus, for example, the derivatives of 17β-hydroxy-5α-androstane herein described possess claudogenic properties including ovulation inhibiting properties. The derivatives of 17α,21-dihydroxy-5α-pregnane-11,20-dione and its 21- and 17,21-esters likewise show claudogenic activity. Progestational activity may be shown by derivatives of 17α-acyloxy-5α-pregnan-20-one In addition, the 2-hydroxymethyl derivatives which fall within the scope of the present invention are valuable biological properties. Thus, the compounds of the present invention may be acylated, halogenated and oxidised. Hydrogenation gives 2-methylated steroids which, inter alia, may be hydrolysed to 2α-methyl-3-oxo steroids of which some are known to possess valuable biological properties such, for example, as 2α,17α-dimethyl-17β-hydroxyl-5α-androstan-3-one.

The present invention provides new 3-enol ethers of 2-hydroxymethyl-3-oxo-5α-steroids including the Formula I below.

According to the present invention there is provided a process for the preparation of 3-enol ethers of 2-hydroxy methyl-3-oxo-5α-steroids including the formula

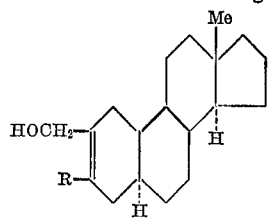
(I)

where R is O-alkyl, O-hydroxyalkyl, O-cycloalkyl or O-aralkyl which process comprises reducing the corresponding 3-enol ether of a 2-formyl-3-oxo-5α-steroid including the formula

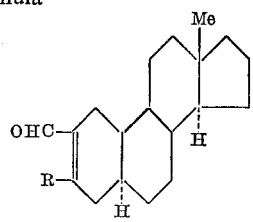
(II)

where R has the same meaning as above.

A wide variety of reducing agents may be used for converting the 2-formyl derivatives (II) which form the starting materials of the invention, into the 2-hydroxymethyl derivatives (I) which form the products of the present invention. Such reducing agents, however, must not be acidic in character, nor must they be used in an acidic medium as the resulting 2-hydroxymethyl derivatives (I) are very sensitive to acids which convert them into dimeric materials.

Conversion of 2-formyl derivatives (II) additionally substituted by systems sensitive to both reduction and alkaline hydrolysis, such as —$COCH_2OAc$, is conveniently achieved catalytically employing Raney nickel as catalyst. Raney nickel as normally prepared is strongly alkaline in reaction. It is therefore advisable to free it from alkali before use, otherwise concomitant hydrolysis of the acylated ketol system may occur. This may be achieved by any method known to those skilled in the art such, for example, as treating it with ethyl acetate.

Platinum on charcoal in the presence of a sodium acetate buffer is another valuable catalyst for hydrogenation. Thus, for example, it may be used to hydrogenate catalytically the 2-formyl group in compounds such as 21-acetoxy-2-formyl-17α-hydroxy-3-methoxy-5α-pregn-2-ene-11,20-dione.

Organometallic hydrides such as, for example, lithium, sodium, magnesium and calcium borohydrides, lithium aluminium hydride and tritertiarybutoxy aluminium hydride represent another group of reducing agents which are particularly valuable for reducing the 2-formyl group in 17α-acyloxy-5α-pregnan-20-one derivatives. Lithium cyanoborohydride may be valuable in certain instances.

The Ponndorf method of reduction may be employed for reducing 2-formyl derivatives that do not contain additional carbonyl groups. Other methods of reduction may be found in standard works of reference such as Houben-Weyl.

The 2-formyl derivatives (II) which form the starting materials of the present invention are prepared by the process of our copending application No. 253,750, filed January 24, 1963. In this process, the 3-enol ether of a 3-oxo-5α-steroid including the Formula III (where R has the meaning hereinabove defined)

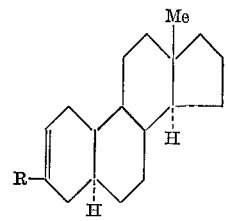
(III)

or a 3,3-dialkoxy-5α-steroid including the Formula IV

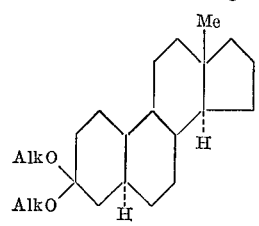
(IV)

is treated with the Vilsmeier reagent (see Houben-Weyl, Methoden der Organische Chemie, 4th ed., 1954, vol. 7 (1), page 29 et seq.), preferably at approximately 0° C. and in a solvent such as ethylenedichloride and the resulting iminium salt decomposed with, for example, aqueous methanolic sodium acetate, when the 2-formyl derivative (II) is obtained. As described in our copending application, the 2-formyl group may be introduced into the 3-enol ethers of 3-oxo-5α-steroids including 3-oxoandrostane, 19-norandrostane, 5α-pregnane, 5α,19-norpregnane, cholestane, spirostane, ergostane, stigmastane and derivatives and analogues thereof which may be additionally substituted by—

Hydroxyl and acyloxy groups and functional derivatives thereof in such positions as 5, 6, 11, 12, 15, 16 (including 16-hydroxymethyl), 17, 18, 20 and 21 (including the condensation products of 16α,17α-glycols with carbonyl components). Thiol groups at $C_{16}$ are unaffected.

Carbonyl groups in such positions as 11, 12, 16, 17, 18 and 20.

Carbalkoxy groups at 13, 16, 17 or in the side chain.

Cyano groups at 13, 16 and 17.

Alkyl groups, in particular Me groups at 4, 5, 6, 11, 16, 17 and 21.

Alkenyl and alkynyl groups such as vinyl, allyl and propynyl at 17.

Methylene and ethylidene groups at 6, 11, 16, 16(17) and 17.

Lactone, ether and spiroketal residues: Spirolactone residues such as —O.CO.$CH_2$.$CH_2$— attached to $C_{17}$, etheric groups at $C_{16}$, and bridging $C_{18}$ and $C_{20}$, spiroketal moieties such as are present in diosgenone.

Halogen groups and in particular chlorine and fluorine substituents in rings C and D or in the side-chain.

Unsaturated linkages at $C_{9(11)}$, $C_{11}$, $C_{14}$, $C_{16}$ and $C_{17(20)}$.

Ketol groups at 16–17, 17–20 and 20–21 which are preferably acylated.

Corticoid side-chains, both acylated, or converted into such "protected" derivatives as bismethylenedioxy, cyclic carbonates, acetonides or orthoformates.

Epoxides and halohydrins, particularly at $C_{16-17}$.

In reducing 2-formyl derivatives containing the foregoing substituents, care should be taken by those skilled in the art in the choice of an appropriate reductant.

The process of the invention may be applied to the 3-enol ethers of 2-formyl-3-oxo-5α-steroids derived from the following steroids and 19-nor analogues thereof and acyl derivatives thereof as well as Bismethylenedioxy derivatives, cyclic carbonates, acetonides and orthoformates of corticoids.

5α-androstane-3,17-dione and its 6- and 16-methyl derivatives, 6 and 11-methylene derivatives and the 11-oxo-11-hydroxy- and 9(11)-dehydro derivatives thereof.

17β-hydroxy-5α-androstan-3-one and its 6-methyl derivatives and the 11-oxo-11-hydroxy- and 9(11)-dehydro derivatives thereof.

17α - alkyl-17β-hydroxy-5α-androstan-3-ones (wherein the alkyl group contains up to 4 carbon atoms) and its 6-methyl derivatives and the 11-oxo-, 11-hydroxy and 9(11)-dehydro derivatives thereof.

17α - alkyl - 17β-hydroxy-5α-androstan-3-ones (wherein the alkyl group contains up to 4 carbon atoms).

17α-alkynyl-17β-hydroxy-5α-androstan-3-ones (wherein the alkynyl group contains up to 5 carbon atoms).

5α-pregnane-3,20-dione and its 6 and 16-methyl derivatives and the 11-oxo, 11-hydroxy and 9(11)-dehydro derivatives thereof.

17α-acetoxy-5α-pregnane-3,20-dione and the 6- and 16-methyl and 16-methylene derivatives and the 11-oxo, 11-hydroxy and 9(11)-dehydro derivatives thereof.

17α-acetoxy-21-fluoro-5α-pregnane-3,20-dione and the 6 and 16-methyl and 16-methylene derivatives and the 11-oxo, 11-hydroxy and 9(11)-dehydro derivatives thereof.

5α-dihydro cortisone and hydrocortisone and the 6-methyl, 16-methyl, 16-methylene and 16α-hydroxy derivatives thereof.

16α,17α-isopropylidenedioxy-5α-pregnane - 3,20 - dione and the 6-methyl derivative and the 11-oxo, 11-hydroxy and 9(11)-dehydro derivatives thereof.

5α-dihydro compound S and the 6-methyl, 16-methyl, 16-methylene, 16-hydroxy derivatives and the 9(11)-dehydro derivatives thereof.

3-(3-oxo-17β-hydroxy-5α - androst - 17α - yl) - propionic acid and lactone and the 11-oxo, 11-hydroxy and 9(11)-dehydro derivatives thereof.

5α-dihydrotestololactone.

3-oxo-5α-pregn-17-enoic acid (esters) and the 6-methyl derivative and the 11-oxo, 11-hydroxy- and 9(11)-dehydro derivatives thereof.

It will be seen that the 3-enol ethers of the 2-hydroxymethyl-3-oxo-5α-steroids derived from the compounds named above, comprise compounds of the general formula:

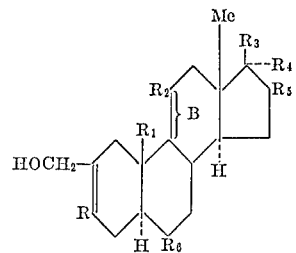

wherein
R is O-alkyl, O-hydroxalkyl, O-cycloalkyl or O-aralkyl
$R_1$ is hydrogen or methyl
$R_2$ is hydrogen, oxo, or hydroxy
$R_3$ is —OH, —$COCH_3$, —$COCH_2F$, —$COCH_2OH$ or —$COCH_2OAc$
$R_4$ is — —H, — —lower alkyl, or — —lower alkynyl
  when $R_3$ is —OH and is — —H, — —OH or — —OAc
  when $R_3$ is —$COCH_3$, $COCH_2F$, —$COCH_2OH$ or —$COCH_2OAc$
$R_3$ and $R_4$ together may be oxo or
  —O.$CH_2$.$CH_2$— — —
$R_5$ is hydrogen, methyl, methylene or hydroxyl
$R_4$ and $R_5$ together may be

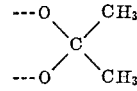

$R_6$ is hydrogen or methyl, and
B is a single bond when $R_2$ is oxo or hydroxy and is either a single or double bond when $R_2$ is hydrogen.

Following is a description by way of example of methods of carrying the invention into effect.

EXAMPLE 1

*17β-Acetoxy-2-Hydroxymethyl-3-Methoxy-5α-Androst-2-Ene*

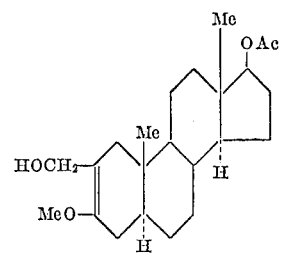

A solution of 17β-acetoxy-2-formyl-3-methoxy-5α-androst-2-ene (1 g.) in methanol (25 ml.) was treated with sodium borohydride (0.2 g.) for 15 minutes at room temperature. Addition of water gave a solid which was crystallised from aqueous methanol containing a trace of pyridine. 17β-acetoxy - 2 - hydroxymethyl-3-methoxy-5α-androst-2-ene separated in needles, M.P. 120–122° C., $[\alpha]_D^{16}+41°$ (c., 0.98 in dioxan).

EXAMPLE 2

*17β-Hydroxy-2-Hydroxymethyl-3-Methoxy-17α-Methyl-5α-Androst-2-Ene*

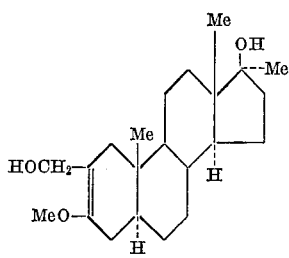

A solution of 17β-acetoxy-2-formyl-17α-methyl-3-methoxy-5α-androst-2-ene (4.25 g.) in dry tetrahydrofuran (100 ml.) was treated with lithium aluminium hydride (3.5 g.), and the mixture stirred under reflux for 2 hours. The mixture was cooled in ice, water was added to decompose the excess of reductant, and the product was isolated with ether. Crystallisation from ether-hexane gave 17β - hydroxy - 2 - hydroxymethyl - 3 - methoxy - 17α-methyl-5α-androst-2-ene microcrystals, M.P. 137–141° C., $[\alpha]_D^{24}$ +33 (c., 1.06 in chloroform).

EXAMPLE 3

*17α-Acetoxy-2-Hydroxymethyl-3-Methoxy-5α-Pregn-2-En-20-One*

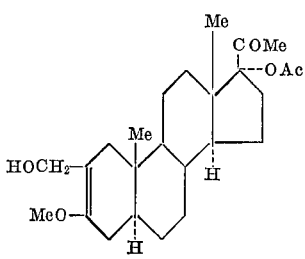

17α - acetoxy - 2 - formyl - 3 - methoxy - 5α - pregn - 2-en-20-one (2 g.) was added to a stirred suspension of lithium borohydride (0.3 g.) in anhydrous tetrahydrofuran (40 ml.). The mixture was stirred for 5 minutes, poured into water, and the product isolated with ether. Crystallisation from aqueous methanol containing a trace of pyridine gave 17α-acetoxy-2-hydroxymethyl-3-methoxy-5α-pregn-2-en-20-one, $\nu_{max.}^{Nujol}$ 3400, 1724 and 1700 cm.$^{-1}$

EXAMPLE 4

*21-Acetoxy-17α-Hydroxy-2-Hydroxymethyl-3-Methoxy-5α-Pregn-2-Ene-11,20-Dione*

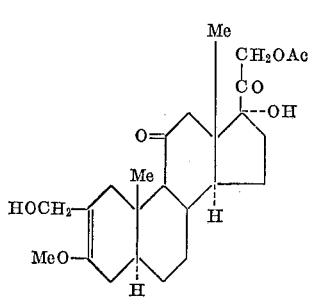

21 - acetoxy - 2 - formyl - 17α - hydroxy 3 - methoxy-5α-pregn-2-ene-11,20-dione (2 g.) was hydrogenated over a pre-reduced 5% platinum-charcoal catalyst (0.25 g.) in methanol (100 ml.) containing sodium acetate (0.3 g.). The absorption of hydrogen almost ceased at one equivalent proportion, when the catalyst was removed by filtration, the filtrate concentrated, water was added and the product isolated with dichloromethane. It was purified from aqueous ethanol containing a trace of pyridine to give 21-acetoxy-17α-hydroxy-2-hydroxymethyl-3-methoxy-5α-pregn-2-ene-11,20-dione, $\nu_{max.}^{Nujol}$ 3400

EXAMPLE 5

*17β-Acetoxy-2-Hydroxymethyl-3-Methoxy-19-Nor-5α-Androst-2-Ene*

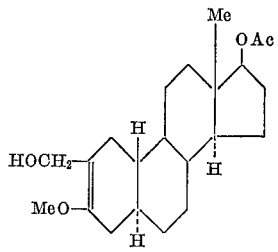

A solution of 17β-acetoxy-2-formyl-3-methoxy-19-nor-5α-androst-2-ene (1 g.) in dry tetrahydrofuran (10 ml.) was added to lithium borohydride (200 mg.) in dry tetrahydrofuran (10 ml.) at room temperature and the mixture stirred for 10 minutes. Thereafter, water was added and the product isolated with ether. Purification by crystallisation gave 17β-acetoxy-2-hydroxymethyl-3-methoxy-19-nor-5α-androst-2-ene.

EXAMPLE 6

*17β-Hydroxy-2-Hydroxymethyl-3-Methoxy-17α-Methyl-19-Nor-5α-Androst-2-Ene*

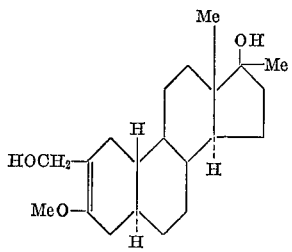

A solution of 17β - acetoxy - 2 - formyl - 17α - methyl - 3 - methoxy - 19 - nor - 5α - androst - 2 - ene (1 g.) in dry tetrahydrofuran (25 ml.) was treated with lithium aluminuium hydride (0.75 g.) and the mixture stirred under reflux for 1½ hours. The mixture was cooled, treated with water, and the product isolated with ether. Crystallization gave 17β - hydroxy - 2 - hydroxymethyl - 3 - methoxy - 17α - methyl - 19 - nor - 5α - androst - 2 - ene, $\nu_{max.}^{Nujol}$ 3400 and 1697 cm.$^{-1}$

We claim:

1. A process for the preparation of a 2(3) unsaturated 3-enol ether of a 2-hydroxymethyl-3-oxo-5α-steroid selected from the group consisting of the androstane, 19-norandrostane, pregnane, 19-norpregnane, cholestane, spirostane, ergostane and stigmastane series, which process comprises reducing a corresponding 3-enol ether of a 2-formyl-3-oxo-5α-steroid with a reducing agent comprising a source of hydrogen in a solvent medium under non-acid conditions.

2. A process as claimed in claim 1 wherein the reducing agent is a metal borohydride.

3. A process as claimed in claim 1 wherein the reducing agent is lithium aluminium hydride.

4. A process as claimed in claim 1 wherein the reduction is effected by catalytic hydrogenation employing platinum on charcoal in the presence of a sodium acetate buffer.

5. A 3-enol ether of the formula:

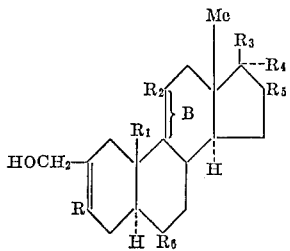

wherein
R is O-lower alkyl;
$R_1$ is selected from the group consisting of hydrogen and methyl
$R_2$ is selected from the group consisting of hydrogen, oxo and hydroxy;
$R_3$ is selected from the group consisting of hydroxy, —COCH$_3$, —COCH$_2$F, —COCH$_2$OH and —COCH$_2$O(acetyl);
$R_4$ is selected from the group consisting of hydrogen, lower alkyl, and lower alkynyl when $R_3$ is hydroxy and is selected from the group consisting of hydrogen, hydroxy and acetoxy when $R_3$ is selected from the group consisting of —COCH$_3$, —COCH$_2$F, —COCH$_2$OH and —COCH$_2$O(acetyl);
$R_3$ and $R_4$ when taken together are selected from the group consisting of oxo and
—O.CO.CH$_2$.CH$_2$———;
$R_5$ is selected from the group consisting of hydrogen, methyl, methylene and hydroxyl;
$R_6$ is selected from the group consisting of hydrogen and methyl, and
B is a single bond when $R_2$ is oxo and hydroxy and is selected from the group consisting of single and double bonds when $R_2$ is hydrogen.

6. 17β - acetoxy - 2 - hydroxymethyl - 3 - methoxy - 5α-androst-2-ene.

7. 17β - hydroxy - 2 - hydroxymethyl - 3 - methoxy - 17α-methyl-5α-androst-2-ene.

8. 17α - acetoxy - 2 - hydroxymethyl - 3 - methoxy - 5α-pregn-2-en-20-one.

9. 21 - acetoxy - 17α - hydroxy - 2 - hydroxymethyl - 3-methoxy-5α-pregn-2-ene-11,20-dione.

10. 17β - acetoxy - 2 - hydroxymethyl - 3 - methoxy - 19-nor-5α-androst-2-ene.

11. 17β - hydroxy - 2 - hydroxymethyl - 3 - methoxy - 17α-methyl-19-nor-5α-androst-2-ene.

No references cited.